Patented May 31, 1932

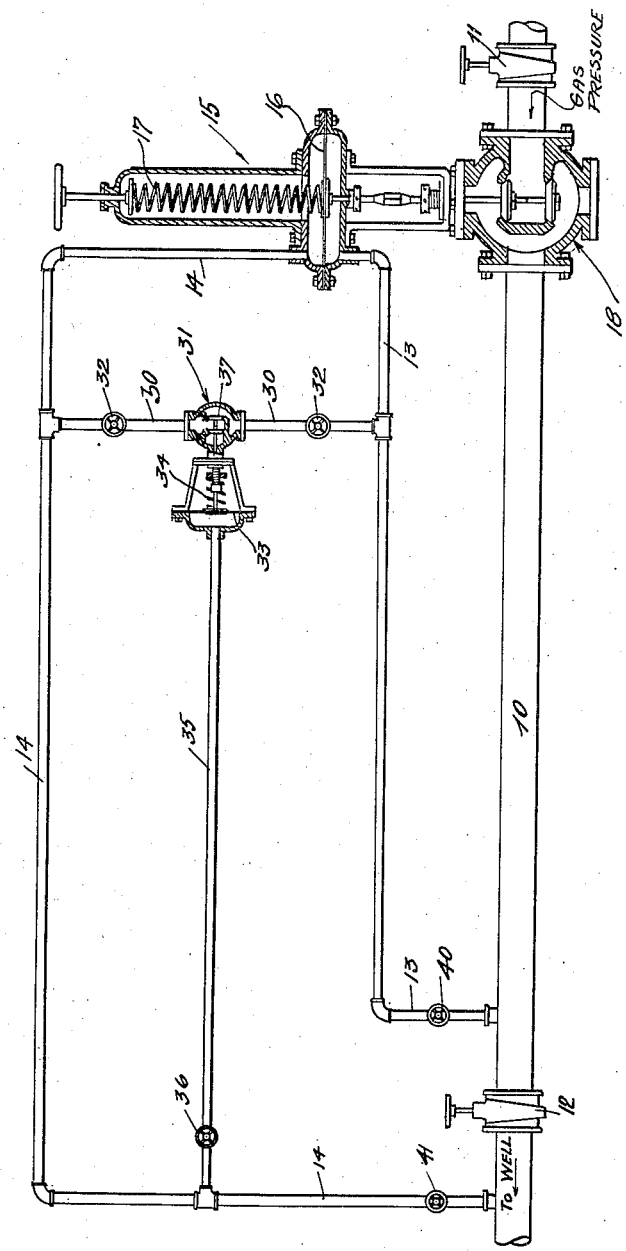

1,860,516

UNITED STATES PATENT OFFICE

JOHN V. THOMAS, OF PASADENA, AND BEN DOUGLASS BALTHIS, OF LOS ANGELES, CALIFORNIA

FLUID FLOW CONTROL SYSTEM

Application filed May 10, 1927, Serial No. 190,173. Renewed April 4, 1932.

This invention has to do with the automatic control of flow of fluid under pressure and for the purpose of controlling flow and supply of fluid in consonance with the requirements of the apparatus to which fluid is being fed.

Although our system may be applied and used wherever similar situations are encountered, and the invention is therefore not limited to the specific use hereinafter described, an explanation of the system as applied to the gas pressure system of pumping wells will best illustrate the typical operation and use of the system and the objects and corresponding advantageous accomplishments of the invention.

In pumping wells, for instance oil wells, by the gas lift system, gas under suitable pressure is introduced in various specific manners beneath the liquid level in the well, the gas mixing with the liquid and forming a light mixed column which rises to the surface. The action of such a gas lift system is uneven. At one time the gas may be more or less freely passing upwardly in the mixed column and consequently a given pressure will put more gas through the well than is desired. At other times conditions may be such that the gas is more or less trapped by oil in the column, or temporary pressures may be developed in the well; and then a greater gas pressure is temporarily necessary. However, if such greater gas pressure were constantly applied to the well, there would be much waste of gas pressure during the times when the gas is flowing freely up through the mixed column. The object of this invention is to control the feed of gas pressure, under such circumstances as here described, so that when a lesser pressure is required the gas will be fed under a correspondingly lesser pressure and volume, and when a higher pressure is required the pressure and volume will correspondingly increase. The invention will be best understood from the following detailed description of a preferred form of the system, reference for this purpose being had to the accompanying drawings, in which the figure is a more or less diagrammatic representation of such a system.

In the drawing let 10 designate the main gas pressure line to which gas is fed under a suitable pressure, valve 11 being provided for shutting off the gas pressure whenever desired and thus putting the system completely out of operation. Pipe 10 leads to the well where the gas performs the function of gas lift as before mentioned. At some point in this pipe 10 there is an orifice of adjustable size, such for instance as is formed by a valve 12. At opposite sides of the adjustable orifice of valve 12 two pipes 13 and 14 lead off to a pressure regulator 15. The pressure regulator here illustrated is merely typical of any pressure regulator in which the diaphragm 16 has opposing pressures applied to its two opposite sides and in which the higher one of the opposing pressures is also opposed by some adjustable force, as the force of an adjustable spring 17. In the particular regulator here illustrated spring 17 presses downwardly on diaphragm 16 to oppose the higher pressure which is applied to the under side of the diaphragm through pipe 13. The lower pressure is applied through pipe 14 to the upper side of the diaphragm. The pressure regulator 15 operates a valve 18 in the usual manner common to such devices, the valve preferably being of the balanced type so that the pressures on the valve itself will not influence the action of the regulator. Spring 17 being set for any predetermined pressure, the regulator and its valve will assume a certain definite position when the difference in pressure at opposite sides of the orifice at valve 12 stands at a certain definite amount. If for any reason that differential pressure should increase, due either to increase of gas pressure fed to pipe 10 or to decrease of back pressure from the well, then diaphragm 16 will rise and will tend to close valve 18, cutting down the pressure applied to the inlet side of valve orifice 12 and thus restoring the differential pressure and gas flow to normal. The opposite action takes place if the differential pressure at opposite sides of the valve orifice should fall. Thus the action of regulator 15, operated by the differential between the pressure at opposite sides of the orifice, is at all times to maintain a predetermined pressure difference at the orifice and thus to maintain, for any given size of orifice, a constant flow of gas through the orifice to the well.

Such a constant flow, however, is not fully suited to the requirements of a gas lift, for the reasons stated above. We therefore, incorporate in our system a further control that acts to modify the action of pressure regulator 15, in such a manner that if the back pressure from the well decreases, the feed of gas under pressure to the well is correspondingly cut down, and if the back pressure from the well increases, the feed of gas to the well is correspondingly increased. This we do in our system by providing, between pipes 13 and 14, a by-pass pipe 30 in which we place a small pressure regulator 31 and also the manually adjustable valves 32. This pressure regulator 31 has a diaphragm 33 to which pressure is applied at one side only, an adjustable spring 34 exerting pressure against the opposite side. Gas pressure is applied to diaphragm 33 through pipe 35, under control of valve 36, from pipe 14. Thus it will be seen that pressure at the outlet side of valve orifice 12 is applied to diaphragm 33, and it is thus the variation of the back pressure from the well that, under suitable adjustable control, controls the passage of pressure between pipes 13 and 14 through by-pass pipe 30.

Suppose now that for any reason the back pressure from the well increases, tending to decrease the differential pressure between pipes 13 and 14. This decrease of differential pressure tends immediately to operate main regulator 15 to increase the pressure at the inlet side of valve orifice 12 to maintain the differential pressure constant and to maintain a constant gas flow. However, it is desired under such circumstances to further increase the pressure at the inlet side of valve orifice 12, so as actually to increase the gas flow through the orifice and to the well whenever back pressure from the well rises. Thus in our system whenever the pressure at the outlet side of orifice 12 increases, the correspondingly increased pressure on diaphragm 33 causes regulator 31 to move its valve 37 toward the right and to relatively open the passage through by-pass pipe 30. The opening of this passage allows fluid pressure to flow between pipe 13 and pipe 14, thus further decreasing the effective differential pressure which is applied to main regulator 15. Remembering that the main regulator 15 opens its valve 18 just in proportion as the applied differential pressure decreases, it will thus be seen that the action of regulator 31 is to so modify the differential pressure applied to regulator 15 as to make that regulator open more widely, and thus supply a higher gas pressure to the orifice 12, in predetermined proportion as the back pressure from the well increases.

The opposite action takes place if the back pressure from the well decreases. Such decrease tends to increase the differential pressure at opposite sides of orifice 12 and to increase the differential pressure applied to main regulator 15, the main regulator tending on such increase of differential pressure to close its valve 18 and cut down the supply of gas. However, when the back pressure from the well falls, regulator 31 moves its valve toward the left and relatively closes that valve, thus cutting down the flow of pressure between pipes 13 and 14, and thus relatively increasing the differential pressure which is effectively applied to main regulator 15. Under this relatively increased differential pressure the main regulator 15 operates to close its valve 18 still further so as to decrease the supply of gas. Thus the action of pressure regulator 31 modifies the action of main regulator 15 so that, instead of feeding to the well the constant supply of gas, that main regulator then acts to feed less gas to the well as the back pressure from the well falls, and feed more gas to the well as the back pressure from the well increases.

It will be noted that the action of main regulator, alone, depends on relative variation of the pressures at opposite sides of the orifice 12, tending to keep the gas flow constant under variations of either the initial gas pressure, or the back pressure from the well, or both. The modifying action of auxiliary regulator 31, however, depends on variation in back pressure alone; thus modifying and controlling the feed of gas in direct response to the instant needs of the well, and unaffected by variations in the feed pressure or in the pressure at the inlet side of the orifice.

The action of the entire system is capable of adjustment to suit varying conditions. Adjustment of spring 17 of the main regulator controls the normal differential pressure which will be maintained at opposite sides of the valve orifice 12. Adjustment of the orifice valve 12 regulates the amount of gas fed to the well under any normal differential pressure. Adjustment of valves 40 and 41 in the lines 13 and 14 respectively controls the speed at which main regulator 15 will act, while adjustment of valve 36 in pipe 35 controls the speed at which auxiliary regulator 31 will act. We prefer to make regulator 31 somewhat sluggish in action so that it will not immediately respond to slight temporary changes in back pressure; and this sluggishness may be attained in part by using a small diaphragm, and therefore a small valve moving force. In fact, by adjusting or proportioning this regulator so that it acts relatively stiffly (as, for instance, by setting its valve rod stuffing box rather tightly) this regulator can be made entirely non-responsive to slight temporary changes of pressure. The extent of the regulatory action of regulator 31 on regulator 15 is controlled by adjustment of valves 32, or by adjustment of those valves 32, or by adjustment of those valves in cooperation with the adjustment of valves 40 and 41. For instance, if valves 40 and 41 are wide open to allow the differential pressures to flow immediately into pipes 13 and 14, and the valves 32 are nearly closed or fully closed, it will be seen that auxiliary regulator 31 will have little or no effect upon the action of main regulator 15; with the result that the main regulator will act substantially in its ordinary manner. But with any given setting of valves 40 and 41, the opening of valves 32 will increase the regulatory effect of regulator 31, increasing the relative diminution of gas supply when the back pressure from the well falls and increasing the relative augmentation of gas supply when the back pressure from the well rises. Adjustment of spring 34 of regulator 31 controls the position of its valve 37 at any given back pressure from the well. Thus the system may be completely adjusted to feed gas to the well under any predetermined normal or average pressure, and further adjusted to increase and decrease the gas feed, under the circumstances described, by any predetermined relative amount.

We claim:

1. The method of controllably feeding a fluid against a varying back pressure, that includes primarily controlling and varying the feed pressure to maintain an even flow, by increasing the feed pressure as the back pressure increases, and vice versa, and secondarily controlling and varying the feed pressure in accordance with the variations of back pressure.

2. The method of controllably feeding a fluid through an orifice against a varying back pressure at its outlet side, that includes primarily controlling and varying the feed pressure to the inlet side of the orifice to maintain a constant pressure differential at opposite sides of the orifice, by increasing the feed pressure on said orifice as the back pressure increases, and vice versa, and secondarily controlling and varying the feed pressure in accordance with variations in the back pressure alone.

3. A fluid flow control system, including an orifice, a regulator actuated by the differential pressures at opposite sides of the orifice. and controlling fluid flow to the inlet side of the orifice, and a regulator actuated by the pressure at the outlet side of the orifice and controlling the application of differential pressures to the first mentioned regulator.

4. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, a valve adapted to relieve the pressure difference of the fluid in the two last mentioned pipes, and a regulator actuating said valve and controlled exclusively by the pressure at the outlet side of said orifice.

5. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, a valve adapted to relieve the pressure difference of the fluid in the two last mentioned pipes, a regulator actuating said valve and controlled exclusively by pressure at the outlet side of said orifice, and means for manually controlling the application of outlet pressure to said last mentioned regulator.

6. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, a valve adapted to relieve the pressure difference of the fluid in the two last mentioned pipes, a regulator actuating said valve and controlled exclusively by the pressure at the outlet side of said orifice, and manual control means to regulate the relief of said pressure difference by the regulator actuated valve.

7. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, a valve adapted to relieve the pressure difference of the fluid in the two last mentioned pipes, a regulator actuating said valve and controlled exclusively by the pressure at the outlet side of said orifice, means for manually controlling the application of outlet pressure to said last mentioned regulator, and manual control means to regulate the relief of said pressure difference by the regulator actuated valve.

8. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, a by-pass between the two last mentioned pipes, a valve in the by-pass, and a regulator actuating said valve and controlled exclusively by pressure at the outlet side of the orifice.

9. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, a by-pass between the two last mentioned pipes, a valve in the by-pass, a regulator actuating said valve and controlled exclusively by pressure at the outlet side of the orifice, and a manually adjustable valve also controlling the by-pass.

10. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, a by-pass between the two last mentioned pipes, a valve in the by-pass, a regulator actuating said valve and controlled exclusively by pressure at the outlet side of the orifice, and means for manually controlling the application of outlet pressure to said last mentioned regulator.

11. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, a by-pass between the two last mentioned pipes, a valve in the by-pass, a regulator actuating said valve and controlled exclusively by pressure at the outlet side of the orifice, a manually adjustable valve also controlling the by-pass, and means for manually controlling the application of outlet pressure to said last mentioned regulator.

12. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, valves in said pipes to control the application of said pressures to the regulator, a valve adapted to relieve the pressure difference of the fluid in the two last mentioned pipes, and a regulator actuating said valve and controlled exclusively by pressure at the outlet side of said orifice.

13. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, valves in said pipes to control the application of said pressures to the regulator, a by-pass between the two last mentioned pipes, a valve in the by-pass, and a regulator actuating said valve and controlled exclusively by pressure at the outlet side of the orifice.

14. A fluid flow control system, including a pipe with an orifice, a valve therein at the inlet side of the orifice, a regulator actuating said valve, said regulator having a double-sided diaphragm, pipes applying pressure from the inlet and outlet sides, respectively, of the orifice to opposite sides of the diaphragm, valves in said pipes to control the application of said pressures to the regulator, a by-pass between the two last mentioned pipes, a valve in the by-pass, a regulator actuating said valve and controlled exclusively by pressure at the outlet side of the orifice, a manually adjustable valve also controlling the by-pass, and means for manually controlling the application of outlet pressure to said last mentioned regulator.

In witness that we claim the foregoing we have hereunto subscribed our names this 23d day of April, 1927.

JOHN V. THOMAS.
BEN DOUGLASS BALTHIS.